J. B. ZIMMERMAN & O. S. SELLS.
TRIMMER FOR BUTT ENDS OF CORN.
APPLICATION FILED JUNE 6, 1912.
1,077,577.
Patented Nov. 4, 1913.
2 SHEETS—SHEET 1.
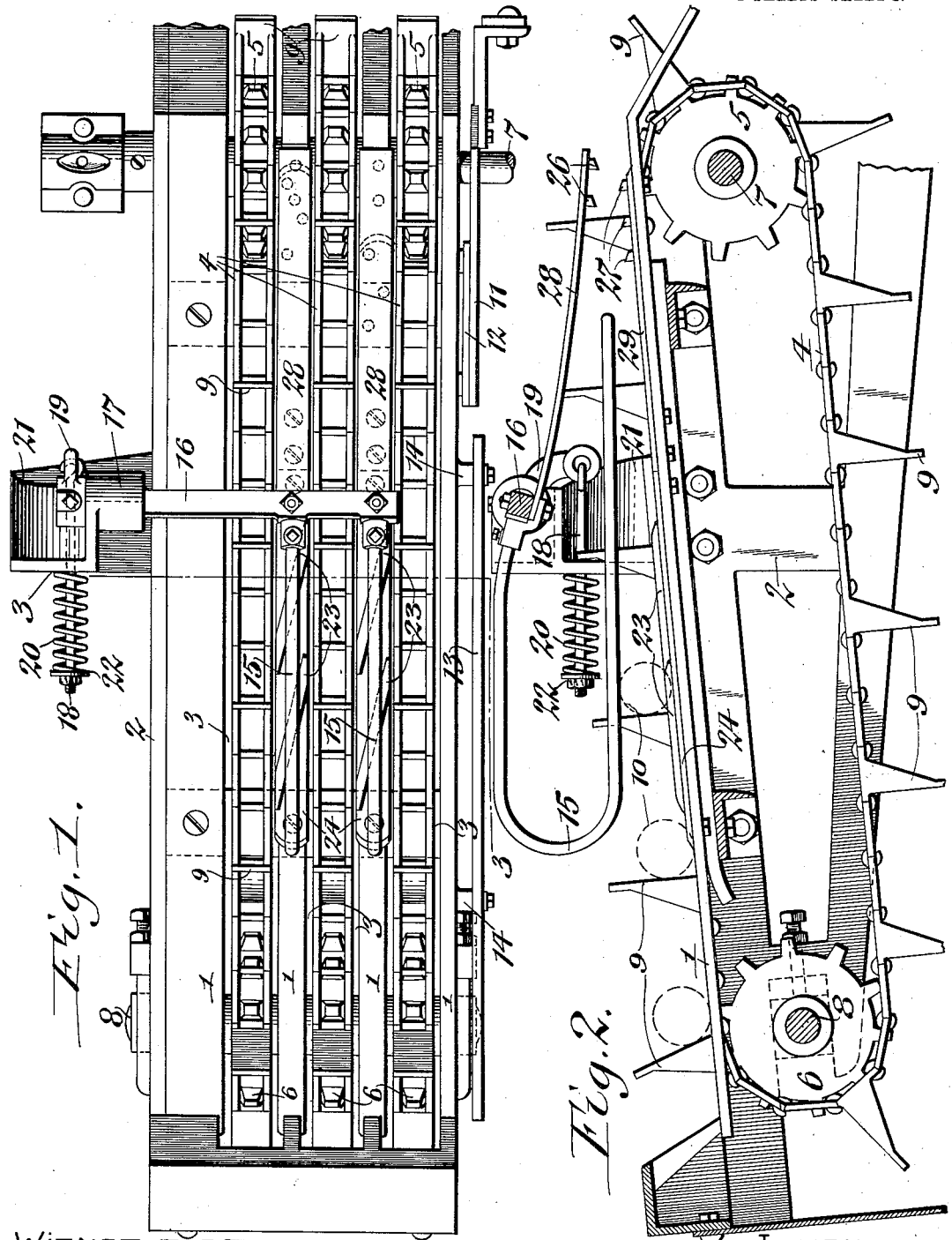

J. B. ZIMMERMAN & O. S. SELLS.
TRIMMER FOR BUTT ENDS OF CORN.
APPLICATION FILED JUNE 6, 1912.

1,077,577.

Patented Nov. 4, 1913.

2 SHEETS—SHEET 2.

WITNESSES
W. Ray Taylor
Anna Heigh

INVENTORS
John B. Zimmerman
Ogden S. Sells,
BY Geyer & Popp
ATTORNEYS

UNITED STATES PATENT OFFICE.

JOHN B. ZIMMERMAN AND OGDEN S. SELLS, OF BUFFALO, NEW YORK, ASSIGNORS TO PEERLESS HUSKER COMPANY, OF BUFFALO, NEW YORK, A CORPORATION OF NEW YORK.

TRIMMER FOR BUTT-ENDS OF CORN.

1,077,577.   Specification of Letters Patent.   Patented Nov. 4, 1913.

Application filed June 6, 1912.   Serial No. 701,962.

*To all whom it may concern:*

Be it known that we, JOHN B. ZIMMERMAN and OGDEN S. SELLS, citizens of the United States, residing at Buffalo, in the county of Erie and State of New York, have invented new and useful Improvements in Trimmers for Butt-Ends of Corn, of which the following is a specification.

This invention relates to a machine for trimming or cutting off the butt ends of green ears of corn so as to facilitate the subsequent removal of the husks therefrom.

It is the object of this invention to provide simple, efficient and inexpensive means whereby this purpose is accomplished.

Figure 3:
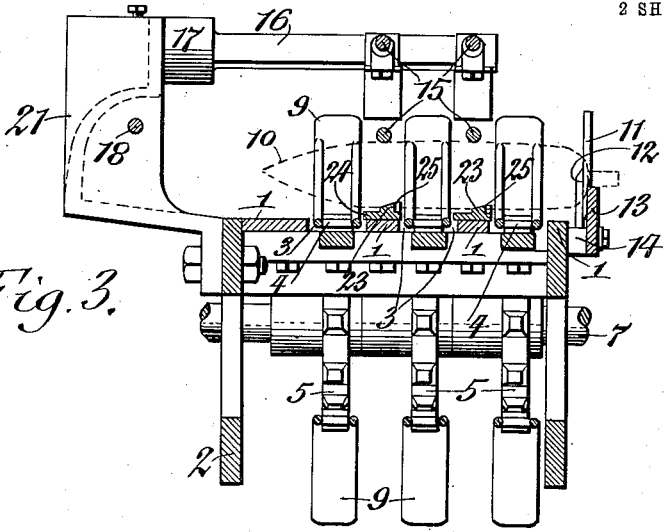
Figure 4:
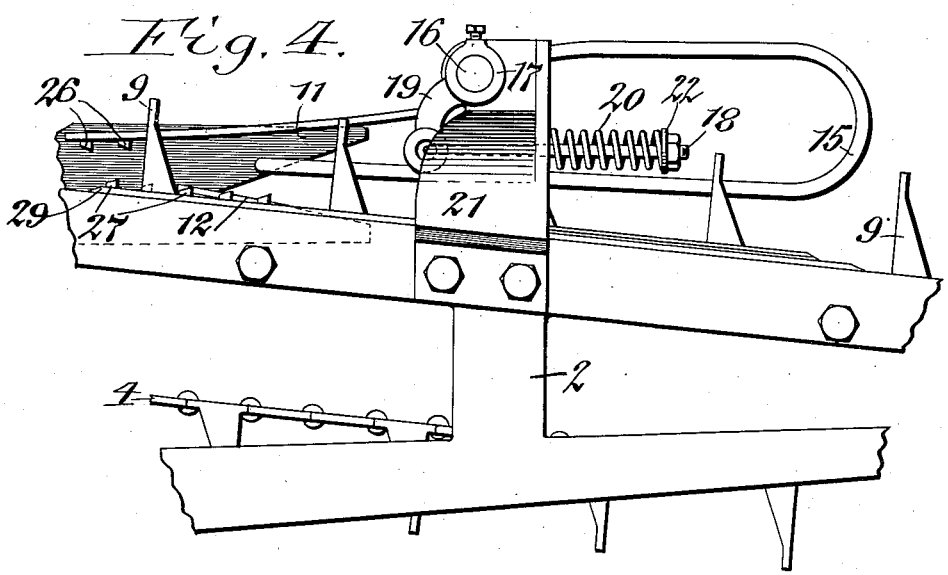
Figure 5:
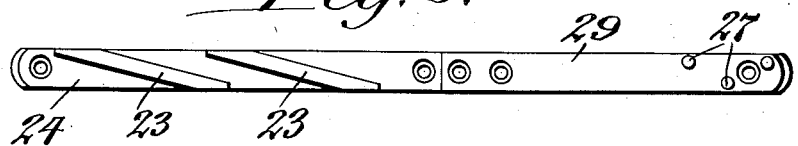

In the accompanying drawings consisting of 2 sheets: Figure 1 is a fragmentary top plan view of a machine embodying our invention. Fig. 2 is a vertical longitudinal section thereof. Fig. 3 is a cross section of the same taken on line 3—3, Fig. 1. Fig. 4 is a fragmentary side elevation of the machine viewed in a direction opposite to that in which Fig. 2 is viewed. Fig. 5 is a detached top plan view of one of the plates having shifting rails whereby the ears of corn are moved toward the gage preparatory to severing the butt thereof.

Similar characters of reference indicate corresponding parts throughout the several views.

In its general organization this machine comprises a feed table, a conveyer whereby the ears of corn are propelled in a crosswise position over said table, a gage against which the butt ends of the ears of corn are pressed, and a cutter which removes the butt ends of the ears of corn.

The feed table preferably comprises a plurality of parallel longitudinal supporting bars 1 which are mounted on the frame 2 and which are separated from each other by intervening longitudinal slots 3. The conveyer preferably comprises a plurality of endless chains or belts 4 each of which moves with its upper operative stretch forwardly lengthwise through the slot between two adjacent supporting bars while its lower stretch is arranged below the feed table. At the front and rear turns of the conveyer belts the same pass around front delivery and rear receiving sprocket wheels 5, 6 and the latter are mounted on front and rear shafts 7, 8 which are journaled in s. itable bearings on the main frame.

Each of the chains or belts of the endless conveyer is provided at intervals with the outwardly projecting wings, flights or fingers 9, the corresponding flights of the several chain belts being arranged transversely in line and adapted to carry the ears of corn 10 in a crosswise position forwardly over the feed table. This movement of the endless conveyer may be produced by applying power to the front shaft 7 by means of a pulley mounted thereon and receiving a driving belt or by any other suitable means.

The cutter whereby the butt ends of the ears of corn are trimmed off may be variously constructed but that shown in the drawings is suitable and comprises a pair of upper and lower blades 11, 12 which are arranged lengthwise on the main frame at the right hand side of the conveyer and the cutting edges of which form a V-shaped notch, as shown in Fig. 4.

13 represents the gage which determines the length of butt to be removed from the ears of corn by the cutter. This gage preferably comprises a longitudinal bar arranged parallel with the feed table and the conveyer at the right hand side of the same and in rear of the cutter and is supported upon the adjacent part of the main frame by means of brackets 14.

While the ears of corn are being carried over the table by means of the conveyer they are pressed downwardly by means of a plurality of spring presser arms 15 each of which is preferably of U-form and connected with a rock shaft 16. The latter is journaled in a suitable bearing 17 on the main frame and yieldingly turned in a direction for pressing the arms 15 downwardly toward the feed table. This yielding pressure is preferably effected by means of a tension rod 18 connected at one end with a depending arm 19 on the rock shaft, and a spring 20 surrounding the tension rod and bearing at one end against a bracket 21 on the main frame and at its other end against a stop 22 mounted on the tension rod.

Each ear of corn is placed crosswise upon the rear end of the feed table by the operator or by mechanism provided for that purpose so that the butt end of the ear is at the right or projecting toward that side of the conveyer on which the gage and cutter are arranged. The ear is then engaged by the wings of the conveyer and propelled in a crosswise position forwardly over the table. As the ear of corn reaches a position transversely in line with the gage the same is automatically shifted in a direction crosswise of the table and conveyer so that the butt of the ear of corn projects over the upper edge of the gage and the breast of the butt engages with the inner side of the gage, as shown by dotted lines in Fig. 3. This transverse movement of the ear of corn is effected by one or more oblique shifting rails, ribs or flanges 23 which are arranged below the path of the ears of corn and engage with the undersides of the same. These shifting rails are arranged at such an angle that the same and the gage bar converge forwardly in the direction of travel of the conveyer. whereby these rails upon engaging with the underside of the ears of corn operate to gradually shift the ears crosswise of the conveyer and table until the butt ends of the same engage with the gage bar. As shown in the drawings a plurality of such shifting rails are arranged between adjacent chains of the conveyer or carrier, each set between adjacent chains being mounted on the upper side of a bar or plate 24 which is in turn secured to the upper surface of the adjacent supporting bar on the table.

For the purpose of accentuating the feeding effect of the shifting rail the rear sides of the same are upright or abrupt and their upper sides slope downwardly and forwardly from the rear sides thereof, thereby producing a comparatively sharp edge 25 at the upper rear corner of each of these rails. This enables the rails to obtain a firm hold upon the ears of corn which are moved forwardly over the same, thereby insuring an effective transverse movement of the ears of corn toward the gage when the same are engaged on their undersides by the shifting rails. While the ears are being thus fed forward by the conveyer and laterally by the shifting rails they are pressed downwardly by the presser arms 15 so that the ears of corn remain reliably in engagement with the wings of the carrier and the shifting rails. After the ears of corn have been moved laterally by the shifting rails they continue their longitudinal forward movement under the action of the conveyer so that the butt ends of the ears are carried past the cutter and the butt ends are severed therefrom, the severed portion corresponding to the distance which the gage is off-set toward the right from the cutter, or is nearer the conveyer than the gage. After the butt ends have been cut off the ears of corn the same continue their forward movement under the action of the conveyer and are engaged on their upper sides by upper and lower husk loosening teeth 26, 27 and then the husks may be completely removed from the ear in any suitable way preparatory to cutting the kernels from the cob. The upper loosening spurs or teeth 26 are preferably mounted on the front ends of spring arms 28 which are mounted at their rear ends on the rock shaft 16. The lower teeth 27 are mounted on plates 29 secured to the table bars 1 in front of the rail plates 24. This means of automatically shifting the ears of corn laterally on the conveyer toward the gage for gaging the butt ends of the ears before trimming the same off by means of the cutter is exceedingly simple and effective and as it involves no moving parts the same is not liable to wear unduly nor require occasional adjustment or other attention.

We claim as our invention:

The combination of a cutter, a gage arranged adjacent to said cutter, a conveyer for moving ears of corn in a crosswise position lengthwise of said gage and past the cutter, and means for moving said ears transversely of said conveyer and toward said gage comprising a shifting rail arranged at an oblique angle relatively to the direction of movement of said conveyer and having a forwardly sloping upperside forming a sharp rear corner which is adapted to engage with the outer side of the ears of corn.

Witness our hands this 3rd day of June. 1912.

JOHN B. ZIMMERMAN.
OGDEN S. SELLS.

Witnesses:
H. SHELDON,
H. J. WHEELER.